April 25, 1933.  L. A. HYLAND  1,905,291
DIRECT CURRENT GENERATOR VOLTAGE REGULATOR
Filed Jan. 6, 1932
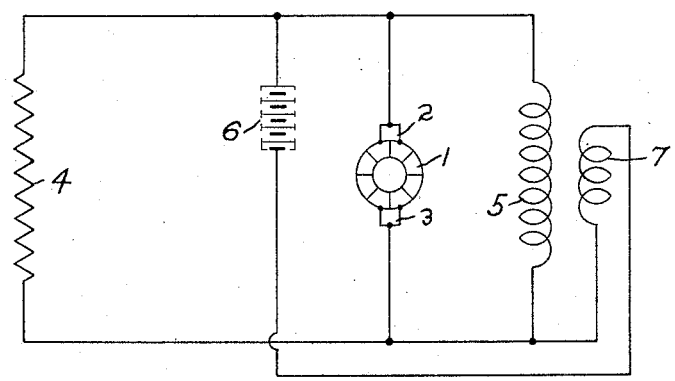
INVENTOR
Lawrence A. Hyland
BY
ATTORNEY

UNITED STATES PATENT OFFICE

LAWRENCE A. HYLAND, OF WASHINGTON, DISTRICT OF COLUMBIA

DIRECT CURRENT GENERATOR VOLTAGE REGULATOR

Application filed January 6, 1932. Serial No. 585,014.

(GRANTED UNDER THE ACT OF MARCH 3, 1883, AS AMENDED APRIL 30, 1928; 370 O. G. 757)

My invention relates to means to control the output voltage of direct current generators, and has for its object to provide means to keep the voltage substantially constant regardless of variations in the load or in the speed of the armature.

The drawing shows schematically the connections for practicing my invention.

It is particularly desirable that the voltage used in aircraft radio devices be accurately controlled. In engine driven machines there is a comparatively large variation of speed, and even in those where the speed is held relatively constant by means of self-regulating air propellers there are speed variations of the order of five to ten per cent, with additional voltage fluctuations due to the load being suddenly applied or withdrawn. The present invention contemplates the use of a dry electrolytic rectifier as the principal element of the voltage control means.

The commutator 1 of a direct current generator has brushes 2 and 3 in contact therewith, these brushes being connected to the load 4. The main field 5 is shunted across the armature. Dry electrolytic rectifier 6, in series with differential field 7, is properly connected across the brushes 2 and 3.

Rectifiers of the type mentioned have a curved characteristic which results in comparatively large changes of current for small changes of voltage. Hence, any change in voltage due either to variations of load or of speed will effect relatively large changes in the total field excitation, due to the fact that field 5 is wound in the opposite sense to differential field 7.

If, for example, the voltage drops due to application of the load 4, there will be a drop in the voltage across rectifier 6 which will cause a large diminution of the current flowing therethrough and through differential field 7; this will make the effective excitation due to main field 5 considerably greater, thus tending to increase the terminal voltage. On the other hand, if there is a tendency for the voltage to increase, there will be a disproportionately greater current through differential field 7 which will reduce the effective excitation of main field 5 and decrease the voltage.

When the proper type of rectifier is used and operated on a suitable part of the rectifier characteristic curve, the voltage is maintained at a substantially constant value regardless of speed and load changes. It is to be noted that in the device herein shown the voltage regulation is accomplished entirely from the low tension part of the direct current system. An additional high tension armature may be provided, but it is not required. The thermionic tube methods of regulating voltage invariably require a high tension source with consequent complications.

It will be understood that the above description and accompanying drawing comprehend only the general and preferred embodiment of my invention, and that various changes in construction, proportion and arrangement of parts may be made within the scope of the appended claim without sacrificing any of the advantages of my invention.

The herein described invention may be manufactured and used by or for the Government of the United States for governmental purposes without the payment to me of any royalties thereon.

Having thus described my invention, what I claim is:

In combination with the commutator of a direct current generator, brushes contacting said commutator and adapted to be connected to a load circuit, a main field circuit connected to said brushes, and a dry electrolytic rectifier and a differential field circuit connected in series across said brushes, said differential field circuit being wound in the opposite sense to the said main field circuit.

LAWRENCE A. HYLAND.